(12) United States Patent
Telpaz et al.

(10) Patent No.: US 11,587,461 B2
(45) Date of Patent: Feb. 21, 2023

(54) CONTEXT-SENSITIVE ADJUSTMENT OF OFF-ROAD GLANCE TIME

(71) Applicant: GM Global Technology Operations LLC, Detroit, MI (US)

(72) Inventors: Ariel Telpaz, Givat Haim Meuhad (IL); Michael Baitaxe, Ra'anana (IL); Donald K. Grimm, Utica, MI (US); Gila Kamhi, Zichron Yaakov (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 550 days.

(21) Appl. No.: 16/661,665

(22) Filed: Oct. 23, 2019

(65) Prior Publication Data

US 2021/0125521 A1   Apr. 29, 2021

(51) Int. Cl.

| | |
|---|---|
| *G09B 19/16* | (2006.01) |
| *G06K 9/62* | (2022.01) |
| *G06T 7/70* | (2017.01) |
| *G06N 3/08* | (2006.01) |
| *G06V 20/59* | (2022.01) |
| *G06V 40/19* | (2022.01) |
| *B60R 11/00* | (2006.01) |
| *H04N 5/247* | (2006.01) |
| *B60R 11/04* | (2006.01) |
| *B60Q 9/00* | (2006.01) |

(52) U.S. Cl.
CPC ............. *G09B 19/167* (2013.01); *B60Q 9/00* (2013.01); *G06K 9/6267* (2013.01); *G06N 3/08* (2013.01); *G06T 7/70* (2017.01); *G06V 20/597* (2022.01); *G06V 40/19* (2022.01); *B60R 11/04* (2013.01); *B60R 2011/0003* (2013.01); *G06T 2207/20084* (2013.01); *G06T 2207/30196* (2013.01); *G06T 2207/30268* (2013.01); *H04N 5/247* (2013.01)

(58) Field of Classification Search
CPC ................ G09B 19/167; G06V 20/597; G06T 2207/30196; G06T 2207/2008; G06N 3/08

See application file for complete search history.

(56) References Cited

U.S. PATENT DOCUMENTS

| | | | | |
|---|---|---|---|---|
| 10,223,602 B2* | 3/2019 | Paszkowicz | ...... | B60W 50/0098 |
| 10,363,945 B2* | 7/2019 | Huang | .................. | B60W 50/14 |
| 10,467,488 B2* | 11/2019 | Sicconi | .................. | G06V 40/20 |
| 11,008,012 B2* | 5/2021 | Kishi | ..................... | A61B 5/163 |
| 11,305,766 B2* | 4/2022 | Hanna | .................... | G06V 40/18 |
| 2017/0313319 A1* | 11/2017 | Kishi | .................... | B60W 10/18 |

(Continued)

*Primary Examiner* — Boubacar Abdou Tchoussou
(74) *Attorney, Agent, or Firm* — Cantor Colburn LLP

(57) ABSTRACT

Methods and systems involve obtaining information from one or more sources to determine a real-time context. A method includes determining a situational awareness score indicating a level of vigilance required based on the real-time context, obtaining images of eyes of a driver to detect a gaze pattern of the driver, determining a relevant attention score indicating a level of engagement of the driver in the real-time context based on a match between the gaze pattern of the driver and the real-time context, and obtaining images of the driver to detect behavior of the driver. A driver readiness score is determined and indicates a level of readiness of the driver to resume driving the vehicle based on the behavior of the driver. An off-road glance time is obtained based on using the situational awareness score, the relevant attention score, and the driver readiness score.

20 Claims, 3 Drawing Sheets

(56) References Cited

U.S. PATENT DOCUMENTS

| | | | |
|---|---|---|---|
| 2018/0099679 A1* | 4/2018 | Huang | B60W 50/16 |
| 2018/0285665 A1* | 10/2018 | Paszkowicz | B60W 50/16 |
| 2019/0213429 A1* | 7/2019 | Sicconi | G06F 3/0346 |
| 2020/0139965 A1* | 5/2020 | Hanna | G06V 20/597 |
| 2020/0207358 A1* | 7/2020 | Katz | G06F 3/017 |
| 2020/0290628 A1* | 9/2020 | Pinoteau | B60W 40/04 |
| 2021/0097408 A1* | 4/2021 | Sicconi | G06V 40/161 |
| 2021/0357670 A1* | 11/2021 | Wu | G08B 21/182 |
| 2022/0011132 A1* | 1/2022 | Jia | B60Q 9/008 |

\* cited by examiner

CONTEXT-SENSITIVE ADJUSTMENT OF OFF-ROAD GLANCE TIME

INTRODUCTION

The subject disclosure relates to context-sensitive adjustment of off-road glance time.

Semi-autonomous vehicle systems automate many aspects of the operation of a vehicle (e.g., automobile, truck, farm equipment, construction equipment, automated factory equipment). Semi-autonomous vehicle systems include collision avoidance, automated braking, and the like. Some semi-autonomous vehicle systems (e.g., Super Cruise) facilitate hands-free driving. These hands-free driving systems typically provide a fixed interval (referred to as off-road glance time) during which the driver may look away from the road. However, based on the real-time situation, that fixed off-road glance time may be too short or too long. Accordingly, it is desirable to provide context-sensitive adjustment of off-road glance time.

SUMMARY

In one exemplary embodiment, a method of adjusting a duration for which a driver using a hands-free mode of a semi-autonomous vehicle may be inattentive to a roadway includes obtaining information from one or more sources to determine a real-time context. The real-time context indicates at least a speed of the vehicle and a distance to a destination. The one or more sources include one or more sensors of the vehicle. The method includes determining a situational awareness score indicating a level of vigilance required based on the real-time context, obtaining images of eyes of the driver to detect a gaze pattern of the driver, and determining a relevant attention score indicating a level of engagement of the driver in the real-time context based on a match between the gaze pattern of the driver and the real-time context. Images of the driver are obtained to detect behavior of the driver. A driver readiness score is determined and indicates a level of readiness of the driver to resume driving the vehicle based on the behavior of the driver. An off-road glance time is obtained based on an adjustment within a range of duration values using the situational awareness score, the relevant attention score, and the driver readiness score.

In addition to one or more of the features described herein, obtaining the information from the one or more sensors of the vehicle includes obtaining information from a camera, a radar system, a global navigation satellite system, or a lidar system.

In addition to one or more of the features described herein, the obtaining the information from the one or more sources of the vehicle includes obtaining information from a communication device.

In addition to one or more of the features described herein, the obtaining the information from the communication device includes obtaining traffic status or weather information.

In addition to one or more of the features described herein, the determining the situational awareness score includes using a machine learning algorithm on the information from the one or more sources.

In addition to one or more of the features described herein, the determining the relevant attention score includes using a neural network to determine the match between the gaze pattern of the driver and the real-time context.

In addition to one or more of the features described herein, detecting the behavior of the driver includes classifying an activity of the driver and classifying a pose of the driver using convolutional neural networks.

In addition to one or more of the features described herein, the determining the driver readiness score includes using a fully connected convolutional neural network on the activity of the driver and the pose of the driver.

In addition to one or more of the features described herein, the method also includes starting a timer based on an off-road glance by the driver while the vehicle is in the hands-free mode.

In addition to one or more of the features described herein, the method also includes providing an alert to the driver based on the timer reaching the off-road glance time.

In another exemplary embodiment, a system to adjust a duration for which a driver using a hands-free mode of a semi-autonomous vehicle may be inattentive to a roadway includes one or more sources to provide information. The one or more sources include one or more sensors of the vehicle. The system also includes a first camera within the vehicle to obtain images of eyes of the driver, and a second camera within the vehicle to obtain images of the driver. A controller determines a real-time context based on the information. The real-time context indicates at least a speed of the vehicle and a distance to a destination. The one or more sources include one or more sensors of the vehicle. The controller determines a situational awareness score indicating a level of vigilance required based on the real-time context, detects a gaze pattern of the driver based on the images of the eyes of the driver, and determines a relevant attention score indicating a level of engagement of the driver in the real-time context based on a match between the gaze pattern of the driver and the real-time context. The controller also detects behavior of the driver based on the images of the driver, determines a driver readiness score indicating a level of readiness of the driver to resume driving the vehicle based on the behavior of the driver, and obtains an off-road glance time based on an adjustment within a range of duration values using the situational awareness score, the relevant attention score, and the driver readiness score.

In addition to one or more of the features described herein, the one or more sensors of the vehicle include a camera, a radar system, a global navigation satellite system, or a lidar system.

In addition to one or more of the features described herein, the one or more sources of the vehicle include a communication device.

In addition to one or more of the features described herein, the information from the communication device includes traffic status or weather information.

In addition to one or more of the features described herein, the controller determines the situational awareness score by using a machine learning algorithm on the information from the one or more sources.

In addition to one or more of the features described herein, the controller determines the relevant attention score by using a neural network to determine the match between the gaze pattern of the driver and the real-time context.

In addition to one or more of the features described herein, the controller detects the behavior of the driver by classifying an activity of the driver and classifying a pose of the driver using convolutional neural networks.

In addition to one or more of the features described herein, the controller determines the driver readiness score by using a fully connected convolutional neural network on the activity of the driver and the pose of the driver.

In addition to one or more of the features described herein, the controller starts a timer based on an off-road glance by the driver while the vehicle is in the hands-free mode.

In addition to one or more of the features described herein, the controller provides an alert to the driver based on the timer reaching the off-road glance time.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
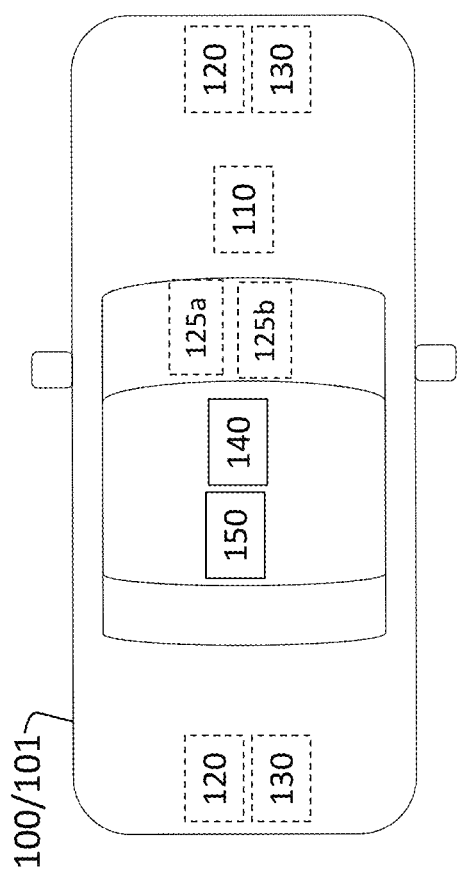
FIG. 1 is a block diagram of a vehicle that provides context-sensitive adjustment of off-road glance time according to one or more embodiments.

The following description is merely exemplary in nature and is not intended to limit the present disclosure, its application or uses. It should be understood that throughout the drawings, corresponding reference numerals indicate like or corresponding parts and features.

As previously noted, hands-free driving may be available in some semi-autonomous vehicles. As also noted, these hands-free driving systems generally allow a fixed off-road glance time during which the driver is not required to be alert to the road. These vehicles may include driver monitoring systems and other sensors to facilitate the hands-free driving and the imposition of the fixed off-road glance time. When traffic is light and circumstances warrant it, the fixed off-road glance time may be shorter than necessary. Similarly, based on heavy traffic or an emergency scenario, driver alertness may be warranted prior to completion of the fixed off-road glance time.

Embodiments of the systems and methods detailed herein relate to context-sensitive adjustment of off-road glance time. Using information from sensors that may also be the sensors used by the hands-free driving system, a determination is made of the relative vigilance required by the real-time circumstances and the current state of the driver. This context information is used to adjust the duration of a dynamic off-road glance time within a range. Specifically, three categories of scores are weighted and summed to determine the way that the dynamic off-road glance time should be adjusted. The first category of score relates to the required level of vigilance, and the second and third categories relate to the current driver state. The second category of score indicates the driver's current level of engagement in the vehicle operation. This is determined by detecting a pattern of the driver's gaze. The third category of score indicates the driver's current level of readiness to resume driving activities. This is determined by detecting the current activity of the driver.

In accordance with an exemplary embodiment, FIG. 1 is a block diagram of a vehicle 100 that provides context-sensitive adjustment of off-road glance time. The exemplary vehicle 100 shown in FIG. 1 is an automobile 101. The vehicle 100 includes several sensors to facilitate the hands-free driving as well as the context-sensitive adjustment. The exemplary sensors shown in FIG. 1 are not intended to limit the numbers and locations of sensors according to alternate embodiments. A camera 120 is shown at the front and rear of the vehicle 100. Additional cameras 120 may be positioned to have a field of view on the sides of the vehicle 100, for example. A radar system 130 is also shown at the front and rear of the vehicle 100. A lidar system 140 is shown on the roof of the vehicle 100.

A global navigation satellite system (GNSS) 150 (e.g., global positioning system (GPS)) is also shown on the roof of the vehicle 100. The GNSS 150 provides location information and facilitates the precision mapping that hands-free driving requires. Two interior cameras 125a and 125b (generally referred to as 125) are shown. One of the interior cameras 125a may be in the dashboard and positioned to obtain images of the eyes of the driver of the vehicle 100, for example. These images would indicate a gaze pattern of the driver. The other interior camera 125b may be positioned to obtain images of the driver to determine actions being taken by the driver, for example. According to alternate embodiments, only one interior camera 125 may be used for both the gaze and behavior detection or more than two cameras 125 may be used.

A controller 110 is also shown in the vehicle 100. According to alternate embodiments, the controller 110 may be a set of controllers 110 that communicate with each other to perform the hands-free driving function and the context-sensitive adjustment of off-road glance time according to one or more embodiments. The functionality of the controller 110 is further discussed with reference to FIG. 2. The controller 110 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 110 additionally includes communication capability to communicate with other vehicles in vehicle-to-vehicle (V2V) communication, to communicate with infrastructure in vehicle-to-infrastructure (V2I) communication, or to communication with any other entity in vehicle-to-everything (V2X) communication. The communication by the controller 110 may facilitate obtaining weather information and obtaining traffic information beyond the field of view of the sensors of the vehicle 100, for example.

Figure 2:
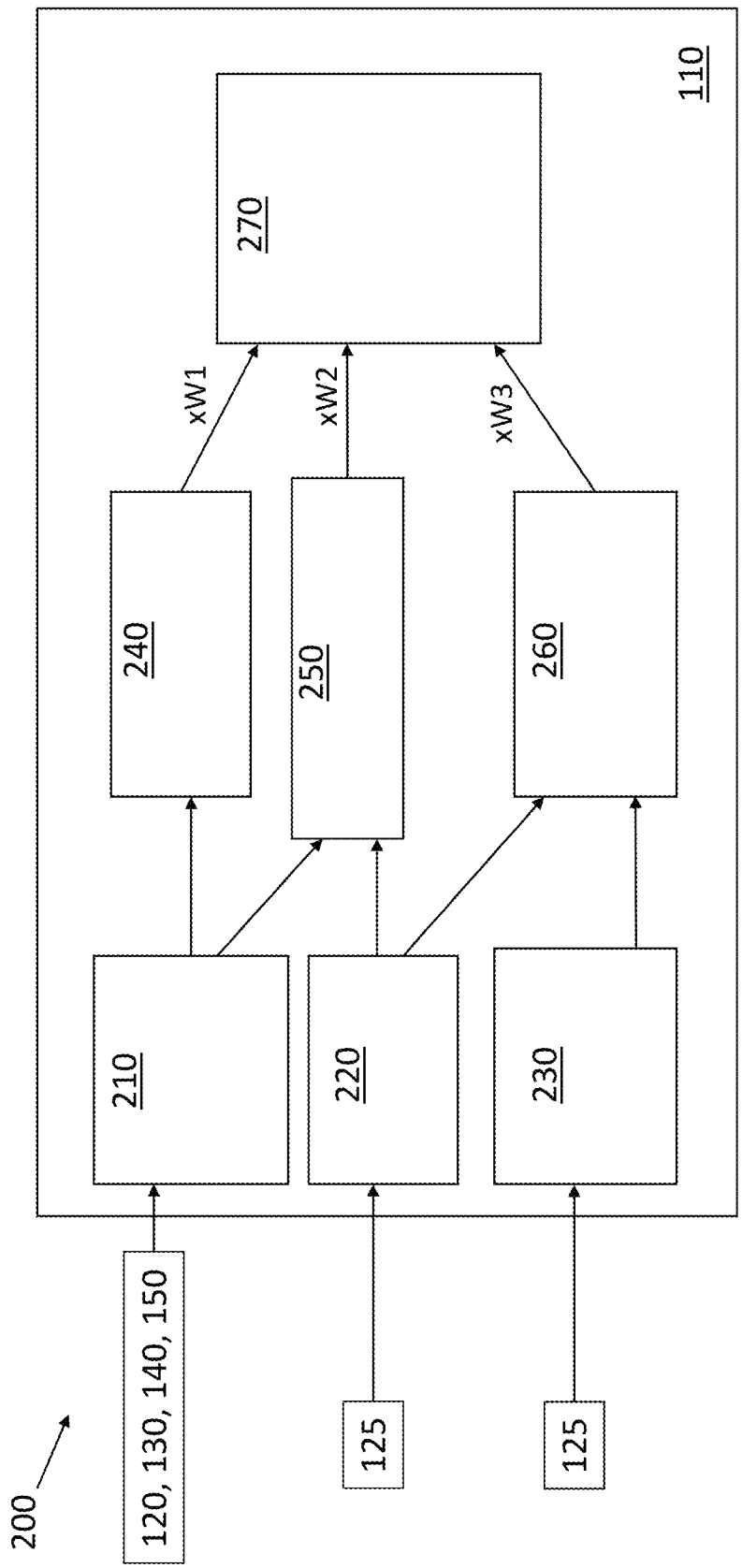
FIG. 2 is a block diagram detailing the functionality of components of the vehicle to provide context-sensitive adjustment of off-road glance time according to one or more embodiments.

FIG. 2 is a block diagram 200 detailing the functionality of components of the vehicle 100 to provide context-sensitive adjustment of off-road glance time according to one or more embodiments. As shown, inputs are provided to the controller 110 from one or more cameras 120, the radar system 130, the lidar system 140, the GNSS 150, and one or more interior cameras 125. Information provided by the camera 120, radar system 130, lidar system 140, and GNSS 150 is used to perform real-time context detection at block 210. The real-time traffic and other factors provided as part of the context detection, at block 210, are assessed to determine the level of vigilance required by the real-time context, at block 240. The processes at blocks 210 and 240 are further detailed.

At block 220, information from an interior camera 125 that detects the driver's eyes is used to perform gaze pattern detection. At block 250, the real-time context detection (from block 210) that indicates the movements of the automobile 100 is compared with the gaze pattern detected at block 220. The comparison indicates the current level of engagement of the driver. That is, the comparison indicates if the driver's gaze matches the operation of the vehicle 100 in hands-free driving mode. For example, the gaze pattern (from block 220) is compared with the real-time context (from block 210) to determine if the driver looked to the left to follow the movement of the vehicle 100 during a left turn. The processes at blocks 220 and 250 are further detailed.

At block 230, information from an interior camera 125 that detects the driver's activity and pose (e.g., talking with hands on steering wheel, holding an object with foot on the seat) is used to perform driver behavior detection. At block 260, the driver behavior information (from block 230) along with the gaze pattern information (from block 220) is used to determine the current level of readiness of the driver. For example, if the driver is not moving, according to the driver activity information from block 230, and the driver's eyes are closed, according to the gaze pattern information from block 220, then the driver is likely asleep and exhibits a relatively low level of readiness to resume control of the vehicle 100. Similarly, if the driver is eating with both hands or has a foot on the driver seat, according to the driver activity information from block 230, the driver exhibits a relatively low level of readiness to resume control of the vehicle 100. The processes at blocks 230 and 260 are further detailed.

The required level of vigilance (from block 240) may be regarded as a required situational awareness score $S_{SA}$. The level of engagement of the driver with regard to the movement of the vehicle 100 (from block 250) may be regarded as a relevant attention score $S_{RA}$. The level of driver readiness to resume driving (from block 260) may be regarded as a driver readiness score $S_{DR}$. Each of these scores may be weighted, as shown in FIG. 2. Thus, the situational awareness score $S_{SA}$ may be multiplied by weight W1, the relevant attention score $S_{RA}$ may be multiplied by weight W2, and the driver readiness score $S_{DR}$ may be multiplied by weight W3. At block 270, the weighted scores are used to determine the off-road glance time within the set range. This may entail increasing or decreasing the off-road glance time from the currently set value, for example. The weighting W1, W2, W3 applied to the score from each of the processes 240, 250, 260 may be determined based on empirical studies or a supervised learning technique. The weighted scores are added to shift the off-road glance time along a continuum (e.g., 4 seconds to 10 seconds). Instead of off-road glance time, a ratio of on-road to off-road glance time may be determined and tracked, according to alternate embodiments.

The processes at blocks 210 and 240 are further discussed. At block 210, information from a number of sources (e.g., camera 120, radar system 130, lidar system 140, GNSS 150, communication by controller 110) is obtained to detect the real-time context. For example, lighting and weather conditions may be obtained by the controller 110 via communication. Road structure and navigation information such as the number of lanes, the type of lane markings and their condition, the type of road (e.g., urban, rural), curvature level of the road, accident history at the location, type of turn required, speed change requirement (e.g., exiting a highway to a surface road or vice versa), and the distance to the destination may be derived from sensors and communication. Specific to the vehicle 100, speed, centering in the lane, acceleration, heading, lane, yaw rate, and the next maneuver may be determined. In addition, the position, relative speed, heading, type, and relative acceleration of one or more other vehicles (e.g., a following vehicle) may be determined.

Based on the information detected at block 210, determining the required level of vigilance at block 240 may involve a machine learning model. For example, a random forest regression model is a supervised learning algorithm made up of decision trees. The decision trees are constructed during training and are trained on different data samples. Within each individual decision tree, the splitting criterion for each node is determined based on a random sub-sample of the input data variables (i.e., information detected at block 210). The random sampling allows overcoming overfitting of the regression model, thereby increasing generalizability of the regression model and preventing the regression model from being limited to the original dataset. The non-linear machine learning model outputs the average prediction (regression) of the individual trees. The output of the random forest regression or other machine leaning model is the situational awareness score $S_{SA}$.

The processes at blocks 220 and 250 are further discussed. At block 220, images of the driver's eyes are used to detect the gaze pattern of the driver. The gaze pattern is based on the proportion of gazes per pixel or bin. That is, the density of the driver's focus over a given number of seconds indicates the gaze pattern. At block 250, this information is compared with the real-time context and, more specifically, the maneuver conducted by the vehicle 100. This comparison indicates the saliency of the maneuver to the gaze pattern of the driver who is not controlling the vehicle 100 due to hands-free driving. For example, the driver may evidence awareness of the vehicle 100 context by gazing to the left or right at intersections, by gazing at a side or rearview mirror, by gazing to the sides to follow the movement of pedestrians, by gazing to follow curves in the roadway, or by gazing a traffic lights at intersections. The comparison of the gaze pattern and real-time context may be performed using a neural network, for example. Essentially, the fit between the gaze pattern of the driver and the driving task of the vehicle 100 is determined by the neural network. This provides the relevant attention score $S_{RA}$.

The processes at blocks 230 and 260 are further discussed. At block 230, images of the driver are used to detect the activity being undertaken by the driver and the pose of the driver. One convolutional neural network (CNN) may be used to classify the activity of the driver. For example, the driver may be holding an object, reading, talking on the phone, talking while moving hands, or may be neutral. Another CNN may be used to classify the pose of the driver. This CNN may determine the distance from the driver's hands to the steering wheel, the distance from the driver's foot to the gas pedal or brake pedal, the distance from the driver's hands to the infotainment system controls, and whether the driver is sitting properly for driving or leaning back, for example. Biometrics (e.g., heartrate) from the driver may additionally be obtained. With all this information as inputs, fully connected layers of a CNN may be used, at block 260, to determine the readiness level of the driver, the driver readiness score $S_{DR}$.

Figure 3:
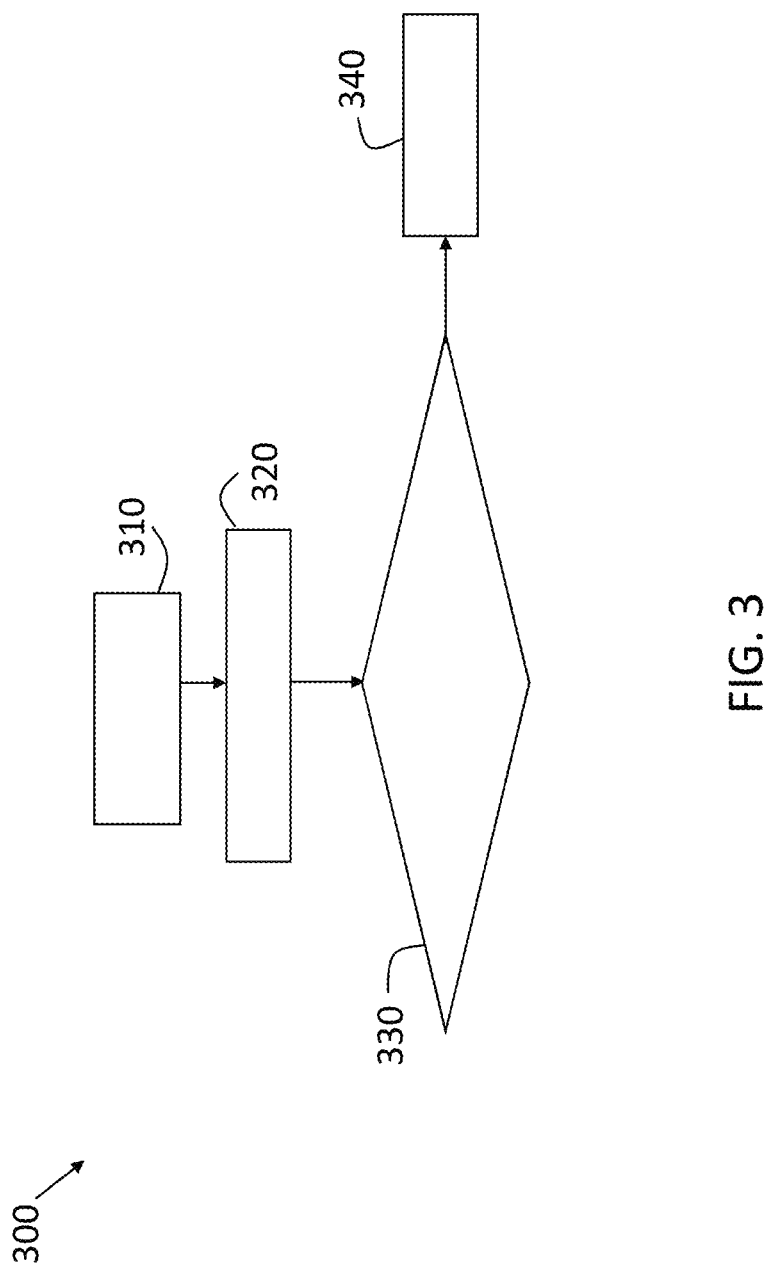
FIG. 3 is a process flow of a method of implementing the off-road glance time determined according to one or more embodiments.

FIG. 3 is a process flow of a method 300 of implementing the off-road glance time determined according to one or more embodiments. According to an exemplary embodiment, the processes shown in FIG. 3 may be implemented only when the hands-free driving feature is activated in the vehicle 100. At block 310, starting the timer may be performed after hands-free driving is engaged and the driver looks away from the road. The gaze pattern detection, at block 220 (FIG. 2), may be used to determine times when the driver is glancing on-road and off-road. At block 320, recording the duration refers to letting the timer run after it has been started (at block 310). Any time the driver resumes glancing on-road, the timer may be reset. Thus, the processes at blocks 310 and 320 may be repeated based on one or more on-road glances by the driver. Once the timer is running, at block 320, a check is done, at block 330, of whether the off-road glance time has been reached. This off-road glance time is determined according to one or more embodiments, as detailed with reference to FIG. 2. The off-road glance time may result from an adjustment within a continuum according to the sum of the weighted scores, for example. The off-road glance time may be updated continuously during hands-free driving. If, based on the check at block 330, the off-road glance time has been reached, the driver may be alerted, at block 340. The alerts at block 340 may be provided using audible, haptic, or other available outputs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of adjusting an off-road glance time, which is a duration for which a driver using a hands-free mode of a semi-autonomous vehicle is allowed to be inattentive to a roadway, the method comprising:
    obtaining information from one or more sources to determine a real-time context, the real-time context indicating at least a speed of the vehicle and a distance to a destination, wherein the one or more sources include one or more sensors of the vehicle;
    determining a situational awareness score indicating a level of vigilance required for the driver to operate the semi-autonomous vehicle based on the real-time context;
    obtaining images of eyes of the driver to detect a gaze pattern of the driver;
    determining a relevant attention score indicating a level of engagement of the driver in the real-time context based on a match between the gaze pattern of the driver and the real-time context;
    obtaining images of the driver to detect behavior of the driver;
    determining a driver readiness score indicating a level of readiness of the driver to resume driving the semi-autonomous vehicle based on the behavior of the driver; and
    adjusting the off-road glance time, which is the duration for which the driver using the hands-free mode of the semi-autonomous vehicle is allowed to be inattentive to the roadway, based on an adjustment within a range of duration values based on a weighted combination of the situational awareness score, the relevant attention score, and the driver readiness score.

2. The method according to claim 1, wherein obtaining the information from the one or more sensors of the vehicle includes obtaining information from a camera, a radar system, a global navigation satellite system, or a lidar system.

3. The method according to claim 2, wherein the obtaining the information from the one or more sources of the vehicle includes obtaining information from a communication device.

4. The method according to claim 3, wherein the obtaining the information from the communication device includes obtaining traffic status or weather information.

5. The method according to claim 1, wherein the determining the situational awareness score includes using a machine learning algorithm on the information from the one or more sources.

6. The method according to claim 1, wherein the determining the relevant attention score includes using a neural network to determine the match between the gaze pattern of the driver and the real-time context.

7. The method according to claim 1, wherein detecting the behavior of the driver includes classifying an activity of the driver and classifying a pose of the driver using convolutional neural networks.

8. The method according to claim 7, wherein the determining the driver readiness score includes using a fully connected convolutional neural network on the activity of the driver and the pose of the driver.

9. The method according to claim 1, further comprising starting a timer based on an off-road glance by the driver while the vehicle is in the hands-free mode.

10. The method according to claim 9, further comprising providing an alert to the driver based on the timer reaching the off-road glance time.

11. A system to adjust an off-road glance time, which is a duration for which a driver using a hands-free mode of a semi-autonomous vehicle is allowed to be inattentive to a roadway, the system comprising:
    one or more sources configured to provide information, wherein the one or more sources include one or more sensors of the vehicle;
    a first camera within the vehicle configured to obtain images of eyes of the driver;
    a second camera within the vehicle configured to obtain images of the driver; and
    a controller configured to determine a real-time context based on the information, the real-time context indicating at least a speed of the vehicle and a distance to a destination, to determine a situational awareness score indicating a level of vigilance required for the driver to operate the semi-autonomous vehicle based on the real-time context, to detect a gaze pattern of the driver based on the images of the eyes of the driver, to determine a relevant attention score indicating a level of engagement of the driver in the real-time context based on a match between the gaze pattern of the driver and the real-time context, to detect behavior of the driver based on the images of the driver, to determine a driver readiness score indicating a level of readiness of the driver to resume driving the vehicle based on the behavior of the driver, and to adjust the off-road glance time, which is the duration for which the driver using the hands-free mode of the semi-autonomous vehicle is allowed to be inattentive to the roadway, based on an adjustment within a range of duration values based on a weighted combination of the situational awareness score, the relevant attention score, and the driver readiness score.

12. The system according to claim 11, wherein the one or more sensors of the vehicle include a camera, a radar system, a global navigation satellite system, or a lidar system.

13. The system according to claim 12, wherein the one or more sources of the vehicle include a communication device.

14. The system according to claim 13, wherein the information from the communication device includes traffic status or weather information.

15. The system according to claim 11, wherein the controller is configured to determine the situational awareness score by using a machine learning algorithm on the information from the one or more sources.

16. The system according to claim 11, wherein the controller is configured to determine the relevant attention score by using a neural network to determine the match between the gaze pattern of the driver and the real-time context.

17. The system according to claim 11, wherein the controller is configured to detect the behavior of the driver by classifying an activity of the driver and classifying a pose of the driver using convolutional neural networks.

18. The system according to claim 17, wherein the controller is configured to determine the driver readiness score by using a fully connected convolutional neural network on the activity of the driver and the pose of the driver.

19. The system according to claim 11, wherein the controller is additionally configured to start a timer based on an off-road glance by the driver while the vehicle is in the hands-free mode.

20. The system according to claim 19, wherein the controller is additionally configured to provide an alert to the driver based on the timer reaching the off-road glance time.

* * * * *

UNITED STATES PATENT AND TRADEMARK OFFICE
CERTIFICATE OF CORRECTION

| | | |
|---|---|---|
| PATENT NO. | : 11,587,461 B2 | |
| APPLICATION NO. | : 16/661665 | |
| DATED | : February 21, 2023 | |
| INVENTOR(S) | : Ariel Telpaz et al. | |

It is certified that error appears in the above-identified patent and that said Letters Patent is hereby corrected as shown below:

On the Title Page

Item (72) The name of the second inventor should be Michael Baltaxe.

Signed and Sealed this
Seventh Day of May, 2024

Katherine Kelly Vidal
*Director of the United States Patent and Trademark Office*